Jan. 25, 1944.  H. STUKART  2,339,890
MEAT TENDERING MACHINE
Filed May 14, 1941  2 Sheets-Sheet 1
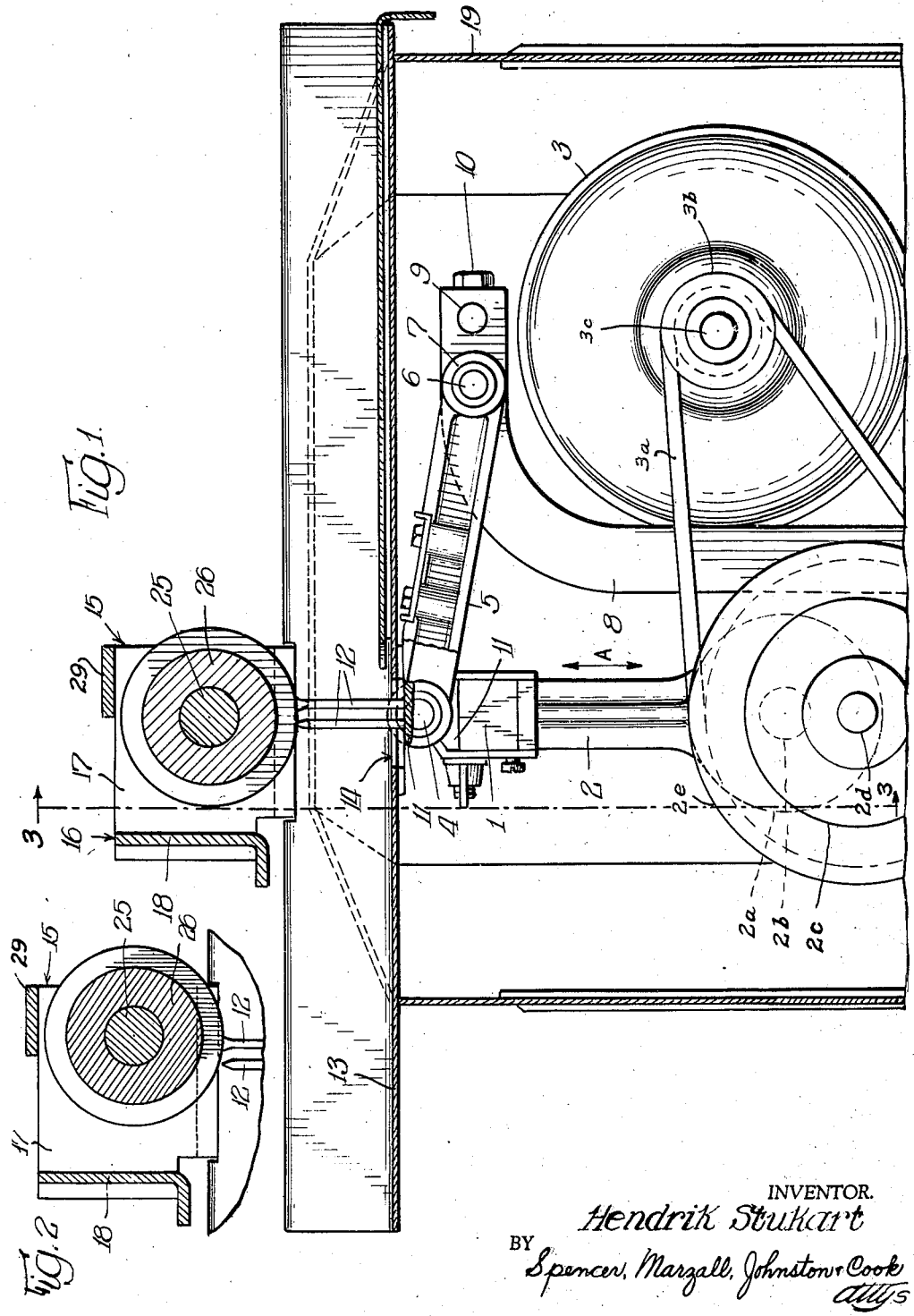
INVENTOR.
Hendrik Stukart
BY Spencer, Marzall, Johnston & Cook
Attys Jan. 25, 1944. H. STUKART 2,339,890
MEAT TENDERING MACHINE
Filed May 14, 1941 2 Sheets-Sheet 2
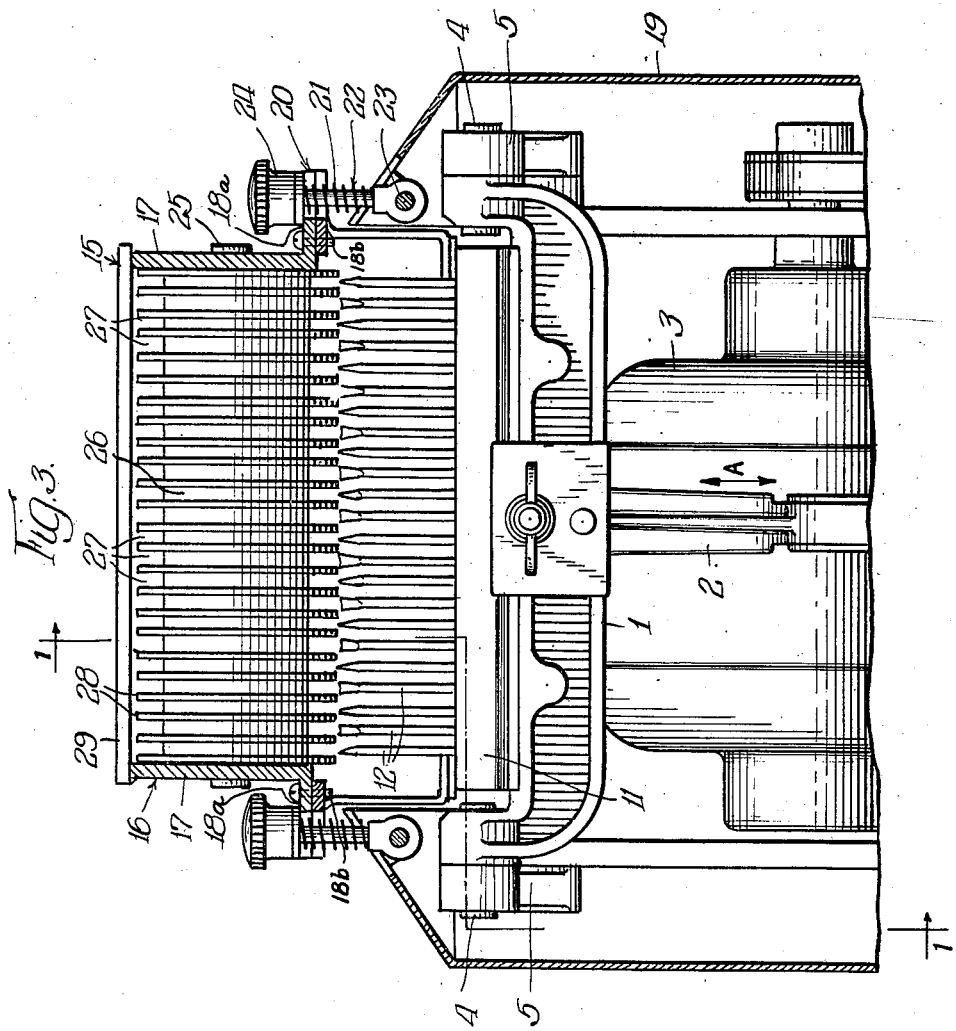
INVENTOR.
Hendrik Stukart
BY Spencer, Marzall, Johnston & Cook.
Attys Patented Jan. 25, 1944

2,339,890

UNITED STATES PATENT OFFICE 2,339,890

MEAT TENDERING MACHINE

Hendrik Stukart, La Porte, Ind., assignor to U. S. Slicing Machine Company, La Porte, Ind., a corporation of Indiana Application May 14, 1941, Serial No. 393,382

9 Claims. (Cl. 17—25)

This invention relates to a tendering machine, particularly for tendering meats, and is of the general type disclosed and claimed in application Serial No. 277,471, filed June 5, 1939, and co-pending application Serial No. 393,381, filed concurrently herewith and assigned to the present assignee. The invention specifically relates to a member for backing the substance during tenderizing and serving in place of the member normally termed in this particular art as a cap-plate.

A primary object of the invention is to provide a new and improved type of member acting for and as a backing member for backing substance to be tenderized and co-operating with the substance piercing tines or tools of the tendering machine to facilitate feeding of the substance through the machine without rubbing.

Another important object of the invention is the provision of a freely mounted roller element suspended above the piercing tines or tools and having spaced peripheral grooves in the roller member to permit proper operation of the tools in a manner to prevent the tools from coming in contact with the body of the roller, the roller permitting the substance to be fed through the machine without friction.

Still another object of the invention is the provision of a grooved roller, the roller being freely mounted in a frame, the roller and frame acting as a backing member for a tendering machine whereby the substance will be moved freely by rolling contact with the substance as the roller is fed through the machine under action of the tendering tines or tools.

A still further object of the invention is the provision of a roller element acting as a backing member for the meat tendering tools or tines so as to permit freedom of movement of the substance without drag against the backing member, the backing member rotating during movement of the substance across the machine.

Numerous other objects and advantages will be apparent throughout the progress of the following specification.

The accompanying drawings illustrate a selected embodiment of the invention and the views therein are as follows:

Fig. 1 is a detail longitudinal sectional view through a meat tendering machine and embodying the invention;

Fig. 2 is a detail sectional view of the roller cap-plate showing the same in a modified position so as to assist in feeding the substance; and Fig. 3 is a detail transverse sectional view through a meat tendering machine and embodying the invention, the view being taken along the line 3—3 of Fig. 1.

The particular tendering machine herein disclosed for the purpose of illustrating the invention comprises a crosshead 1 carried by an arm 2 which is reciprocated in a generally vertical direction as indicated by the arrow A, Figs. 1 and 3, by an electric motor 3. The lower end of the arm 2 terminates in a bearing portion 2a which is rotatably received on a crank pin 2b eccentrically mounted on a plate 2c attached to a crank shaft 2d. A pulley 2e is attached to the crank shaft 2d and is rotated by a belt 3a driven by a pulley 3b attached to the shaft 3c of the motor 3. The arm 2 and cross-head 1 are thus caused to reciprocate in a generally vertical direction by the motor 3. The ends of the crosshead 1 are provided with supporting shafts or studs 4 journaled at the ends of oppositely disposed links 5. The inner ends of the links 5 are rigidly fixed to a transverse shaft 6 supported in the bearings 7 formed in spaced supports 8. The supports 8 are rigidly secured to the base or frame of the machine and are maintained in rigid spaced apart relationship by a cross rod 9 passing through the ends of the supports 8 and rigidly locked thereto by means of screws 10. A tine supporting member 11 is detachably secured to the crosshead 1 and carries a plurality of longitudinally spaced apart pairs of tines 12. The construction so far described forms no part of the present invention except insofar as the parts may enter into the general combination. The said described construction is identical with that disclosed and claimed in the aforesaid co-pending application, Serial No. 393,381, filed concurrently herewith.

The construction, operation, and location of the parts so far described is for the purpose of operating the tools or tines to tender a piece of meat or other substance on a substance supporting trough 13. The operation of the machine is such that the tines move in an orbit passing through slots 14 provided in the trough to pierce a piece of meat or other substance. The tines not only move upwardly through the substance but move forwardly to the left, Fig. 1. This movement of the tines not only causes the meat to be pierced and tenderized by the tines 12 but also causes the meat to be fed to the left, Fig. 1, as the tines move in an orbit. The feeding and piercing movement of the tines is also disclosed in the aforesaid co-pending applications. The present invention relates specifically to a member designated generally by the numeral 15 which takes the place of the cap-plate or backing member identified by the numeral 66 in assignee's aforesaid concurrently filed application.

The member 15 comprises a relatively U-shaped frame 16, including end plates or walls 17 rigidly connected to a rear wall 18. The sides of the end walls or plates 17 may be turned outwardly to provide outwardly extending supporting members or feet 18a for attachment to the upper part of the machine casing 19. These supporting members or feet 18a are provided with slots 20 to receive the stems 21 of locking members 22. The locking members 22 are pivotally mounted at 23 to a part of the machine casing or housing 19 and are provided with thumb nuts 24 for locking rigidly the member 15 in position on the machine frame. Centering pins 18b of the type disclosed in the aforesaid concurrently filed application, pass through the feet or projections 18a and engage recesses in the housing to position properly the member 15 with respect to the tine supporting member or bar 11. The member 15, because of the locking members 22, is instantly and quickly removable for the purpose of cleaning or otherwise, the mere manipulation or operation of the locking members 22 being all that is necessary to release and detach the member 15.

A transverse shaft 25 has its ends rotatably mounted in the end plates 17 of the member 15 and supports a roller element 26 with which the tines or tools 12 co-operate. The roller 26 is provided with a plurality of spaced peripheral grooves 27 into which the ends of pairs of tines or tools 12 extend a predetermined distance during their movement to tenderize the substance. The grooves 27 are of sufficient width to permit proper operation of the tines without coming in contact with the annular rings 28 formed therein by reason of the grooves 27 in the roller 26. The roller 26 is mounted rotatably and freely in the end plates 17 so that there will be no rubbing between the meat and the member 15 because the movement of the substance as it passes through the machine will cause the roller 26 to rotate.

The roller 26, which may be in the form of a solid cylinder having spaced peripheral grooves is accurately positioned so as to overcome axial or longitudinal movement, and, therefore, there is no danger of the tines or tools 12 ever coming in contact with or being fouled by the rings 28. The frame 16 may be rendered more rigid by the provision of a strap 29 extending across the top of the frame and rigidly secured to the end plates 17 in any desirable manner such as by welding.

The axle or shaft 25 may be made an integral part of the roller 26, or it may constitute a separate member to which the roller is rigidly secured. Instead of making the roller 26 rigid with the shaft 25, and the shaft 25 rotatably mounted in the end plate 17, the shaft 25 may be rigidly secured to the end plates 17 and the body of the roller may rotate freely about the shaft. However, the formerly described construction is preferred so that there will be no longitudinal or axial movement of the roller with respect to the tines, and therefore all danger of the tines coming in contact with the rings 28 is prevented. In actual practice it has been found desirable to make all the parts constituting the member 15 out of metal, but it is to be understood, of course, that the parts may be made of hard wood or any other material suitable for the purpose.

In the modified position of the roller 26 shown in Fig. 2, it is spaced to the right of the position shown in Fig. 1, so as to effect easier feeding of the substance. In Fig. 2 the tines or needles 12 extend into the spaces or grooves but to one side of the axial central line of the roller 26 so that during the feeding operation of the substance, caused by the orbital movement of the tines 12, all friction or drag is practically overcome and it might even be said that this arrangement assists in feeding the substance. During movement of the substance beneath the roller 26, Fig. 2, the roller is caused to roll and therefore to overcome all resistance or friction. In actual practice it has been found that the positioning of the roller in the manner shown in Fig. 2 is ofttimes more advantageous than by having the roller 26 positioned as shown in Fig. 1.

The invention provides a rotary member which acts as a backing member for the tines during their movement of orbital travel. The member is cylindrical in shape and being rotarily mounted overcomes sliding or rubbing of the meat. The member 15 is made as a unitary element which is adapted to be quickly and easily applied ot or removed from the machine for cleaning purposes or otherwise. Moreover, the entire element itself being of a unitary character and removable as a single unit, can be easily washed and cleaned. The parts constituting the member 15 are relatively few in number and simple in construction, and the device may be economically manufactured. The construction of the member 15 is such that it is readily applicable to existing machines as well as to new machines.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A machine of the character described for tendering substance such as meat and comprising a plurality of reciprocatory tines, means for reciprocating said tines through a predetermined path, and a backing member co-operating with said tines and comprising a roller element arranged in juxtaposition with respect to said tines, said roller being provided with a plurality of spaced grooves into which the ends of the tines may project a predetermined distance.

2. A machine of the character described for tendering substance such as meat and comprising a plurality of reciprocatory substance piercing tools, means for reciprocating the tools through a predetermined path to pierce the substance and feed the substance through the machine, and a backing member co-operating with the tools, said backing member comprising a grooved roller rotatable by the substance at a speed equal to the feeding speed of the substance.

3. A machine of the character described for tendering substance such as meat and comprising a plurality of reciprocatory substance piercing tools, means for reciprocating the tools through a predetermined path to pierce the substance and feed the substance through the machine, and a backing means co-operating with the tools, said backing means comprising a grooved roller mounted freely to be moved by the substance and at the same rate of speed as the substance so as to prevent the substance from rubbing against the backing means.

4. A machine of the character described for tendering substance such as meat and comprising a plurality of reciprocatory substance piercing tools, means for reciprocating the tools through a predetermined path to pierce the substance and feed the substance through the machine, and a backing member co-operating with the tools, said backing member comprising a rotatably mounted member having a plurality of flanges which extend a predetermined distance between the tools during reciprocatory movement of the tools.

5. A machine of the character described for tendering substance such as meat and comprising a plurality of reciprocatory substance piercing tools, means to move the tools through a predetermined orbital path to pierce the substance and feed the substance through the machine, and a backing member co-operating with the tools, said backing member comprising a roller provided with a plurality of grooves into which the tools are adapted to extend a predetermined distance.

6. A machine of the character described for tendering substance such as meat and comprising a plurality of reciprocatory tines, means for reciprocating said tines through a predetermined path, a housing for enclosing said tines and said reciprocating means, and a backing member cooperating with said tines, said member comprising a unitary frame structure and a roller mounted for free rotation in said frame structure, and locking means for detachably mounting said unitary frame structure on said housing with said roller arranged in juxtaposition with respect to said tines to provide a backing for the substance to be tenderized, said frame structure and said roller being removable as a unit upon release of said locking means.

7. A machine of the character described for tendering substance such as meat and comprising a plurality of reciprocatory substance piercing tools, means for reciprocating the tools through a predetermined path to pierce the substance and feed the substance through the machine, and a backing member cooperating with the tools, said backing member being a unitary structure comprising a frame and a grooved roller supported thereby, and means for detachably mounting said structure in cooperating juxtaposition with respect to said tools.

8. A machine of the character described for tendering substance such as meat and comprising a plurality of reciprocatory substance piercing tools, means to move the tools through a predetermined orbital path to pierce the substance and feed the substance through the machine, and a backing for the foodstuff comprising a grooved roller rotatable by the substance at the same rate of speed as the feed of the substance.

9. A machine of the character described for tendering substance such as meat and comprising a plurality of reciprocatory substance piercing tools, means to move the tools through a predetermined orbital path to pierce the substance and feed the substance through the machine, and a backing member comprising grooved means engaged by the substance and mounted for free movement by said substance at a speed equal to the feeding speed of the substance.

HENDRIK STUKART.